Feb. 17, 1970  S. F. TEMMER  3,496,299
SIMULTANEOUS ACCESS INFORMATION RETRIEVAL
APPARATUS AND METHOD
Filed Nov. 14, 1966  2 Sheets-Sheet 1
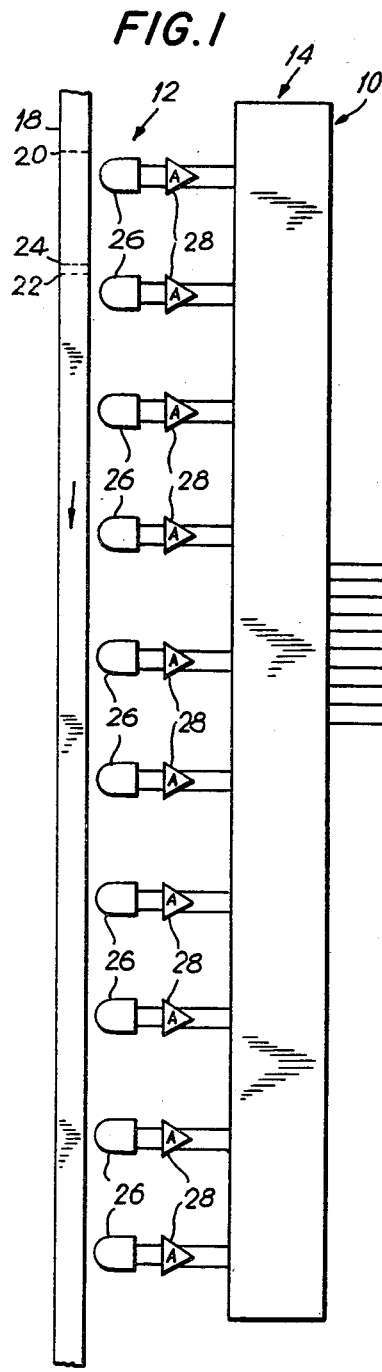
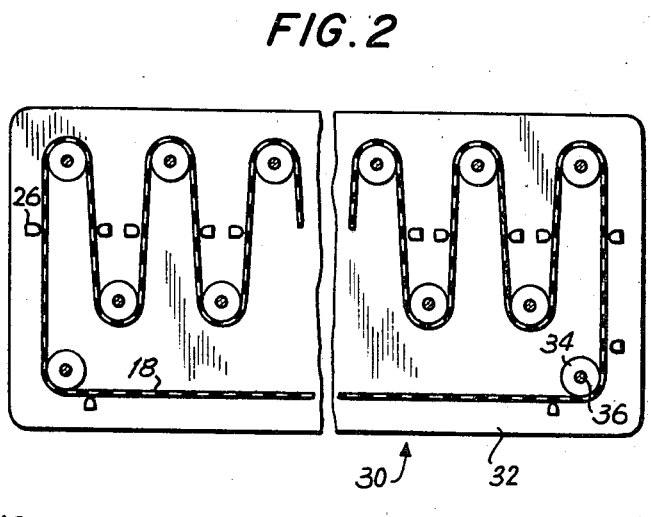
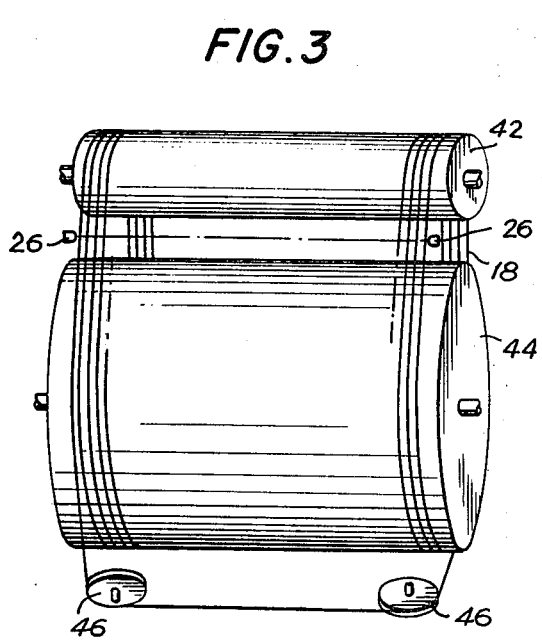
*INVENTOR.*
STEPHEN F. TEMMER
BY Lackenbach & Siegel
ATTORNEYS Feb. 17, 1970  S. F. TEMMER  3,496,299
SIMULTANEOUS ACCESS INFORMATION RETRIEVAL
APPARATUS AND METHOD
Filed Nov. 14, 1966  2 Sheets-Sheet 2

INVENTOR.
STEPHEN F. TEMMER
BY
ATTORNEYS

United States Patent Office 3,496,299
Patented Feb. 17, 1970

3,496,299
SIMULTANEOUS ACCESS INFORMATION RE-
TRIEVAL APPARATUS AND METHOD
Stephen F. Temmer, New York, N.Y., assignor to Infotronic Systems, Inc., New York, N.Y., a corporation of New York
Filed Nov. 14, 1966, Ser. No. 598,141
Int. Cl. H04m 11/00
U.S. Cl. 179—6                                    7 Claims

ABSTRACT OF THE DISCLOSURE

Apparatus and systems are disclosed for enabling a plurality of interrogators or callers to simultaneously gain access to electronically stored information, such as a lecture, or the like, and particularly information magnetically optically or mechanically recorded on a single wire, tape, belt, or the like from local or remote locations, as by commercial telephone equipment even though such access was requested at different times.

---

This invention relates generally to information retrieval methods, apparatus and systems and more particularly to information retrieval methods, apparatus and systems for enabling simultaneous access to recorded information in response to non-simultaneous requests for access to the recorded information.

Electronic recording and reproducing systems and apparatus are being increasingly utilized as a vehicle for storing information and reproducing such information at any convenient time and place; sometimes at multiple locations and/or at locations spacially removed from the information storage facility or archive. It has been previously suggested that access could be gained to a wealth of stored information at some central location simply by dialing a telephone number at a remote location and having a reproducer present such stored information, which might comprise both visual and audible information, quickly and readily at the remote location.

Such systems are presently in use, especially in the field of education, for use in study carrells in universities and schools, enabling students to gain access, from multiple locations, to materials such as lectures, poems, plays, musical selections, foreign language study lessons, etc. Dial access systems, using the commercial telephone network to provide information retrieval have also been suggested.

System as are presently in use commonly utilize some form of magnetic playback unit, most commonly a so-called cartridge tape reproducer which has information stored on an endless tape so that as soon as the recording has been played, the machine recycles and halts at the beginning of the recorded program ready to play it immediately again to someone else who may dial into the system. In present systems, since the dialer chooses his time of interrogation independently from all other dialers, each inquirer ties up a complete reproducer and blocks this reproducer for use by any subsequent dialer. Such systems necessitate vast apparatus parks, basically a reproducer and tape cartridge for each caller, or group of callers, at any given moment, listening to a recording. Such systems are both expensive and wasteful since that portion of the recording which has already passed the reproducing head or playback device and that portion of the recording which is yet to pass the reproducing head or playback device are unused and effectively dormant when such portions could well be in service playing back the recording to a caller who requested the particular recording at a time different from that of the first caller.

Accordingly, it is a primary object of the present invention to provide methods, apparatus and systems for enabling simultaneous access to a recording by a plurality of non-simultaneous callers.

Another primary object of the present invention, in addition to the foregoing object, is to provide methods, apparatus and systems for enabling simultaneous access to a recording by a plurality of non-simultaneous callers by exposing multiple portions of the recording to a plurality of playback devices simultaneously.

A further primary object of the present invention, in addition to the foregoing objects, is to provide methods, apparatus and systems for enabling simultaneous access to a recording by a plurality of non-simultaneous callers by exposing multiple portions of the recording to a plurality of playback devices simultaneously and selectively connecting the callers with the playback devices.

Still another primary object of the present invention, in addition to the foregoing objects, is to provide methods, apparatus and systems for enabling access by a plurality of non-simultaneous callers to a desired portion of a recording, such as the beginning thereof, with a minimum delay.

Yet another primary object of the present invention, in addition to the foregoing objects, is to provide methods, apparatus and systems for enabling access by a plurality of non-simultaneous callers to a desired portion of a recording, such as the beginning thereof, within a time period substantially less than the time period of the recording.

Another and still further primary object of the present invention, in addition to the foregoing objects, is to provide methods, apparatus and systems for playing different portions of a recording to a plurality of listeners simultaneously.

Another and yet still further primary object of the present invention, in addition to the foregoing objects, is to provide methods, apparatus and systems for playing different portions of a recording to a plurality of listeners simultaneously and enable each listener to gain access to the recording within a delay period substantially less than the playing time of the recording.

It is also a primary object of the present invention, in addition to the foregoing objects, to provide methods, apparatus and systems for simultaneously reproducing different portions of a recording for a plurality of listeners, who may be at locations remote from the recording and who request access thereto at differing times as by exposing multiple portions of the recording to a plurality of playback devices positioned relative thereto and selectively connecting the listeners to such devices to enable each listener to commence listening, for example, at the beginning of the recording.

A still further primary object of the present invention, in addition to the foregoing objects, is to provide methods, apparatus and systems for simultaneously reproducing different portions of a recording for a plurality of listeners, who may be at locations remote from the recording and who request access thereto at differing times by exposing multiple portions of the recording to a plurality of playback devices positioned relative thereto and selectively connecting the listeners to such devices to enable each listener to commence listening, for example at the beginning of the recording and wherein the maximum delay time encountered by any listener before commencement of playback of the recording to him is substantially less than and proportional to the playback time of the complete recording.

Another primary object of the present invention, in addition to the foregoing objects is to provide methods, apparatus and systems for exposing an endless recording to a plurality of playback devices to enable simultaneous playback of different portions of the recording.

It is also a primary object of the present invention, in addition to the foregoing objects, to provide apparatus for moving an endless recording relative to a plurality of playback devices positioned relative thereto to expose the entire recording sequentially to each of the playback devices and to enable simultaneous playback of multiple portions of the recording.

Another and yet still further primary object of the present invention, in addition to the foregoing objects, is to provide apparatus for moving a plurality of playback devices relative to recording to expose the entire recording sequentially to the devices and enable simultaneous playback of multiple portions of the recording.

A further primary object of the present invention, in addition to the foregoing objects, is to provide apparatus for selectively moving a plurality of playback devices relative to a recording to enable selective exposure of the recording to the playback devices.

The invention resides in the combination, construction, arrangement and disposition of the various component parts and elements incorporated in improved information retrieval apparatus and systems, and in improved methods of information retrieval, in accordance with the principles of this invention. The present invention will be better understood and objects and important features other than those specifically enumerated above will become apparent when consideration is given to the following details and description, which when taken in conjuction with the annexed drawing described, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reversed especially as they fall within the scope and spirit of the subjoined claims.

In the drawing:

FIG. 1 is a schematic illustration of an information retrieval system constructed in accordance with the principles of the present invention;

FIG. 2 is a schematic illustration of a recording and playback device constructed in accordance with the principles of the present invention suitable for use in the system of FIG. 1;

FIG. 3 is a schematic illustration of another recording and playback device constructed in accordance with the principles of the present invention suitable for use in the system of FIG. 1;

Figure 4:
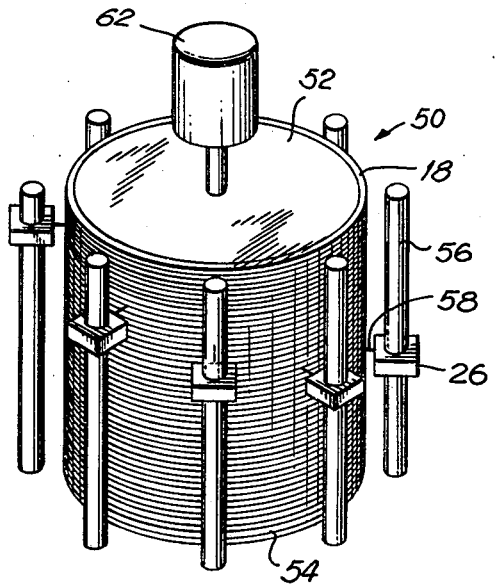
FIG. 4 is a schematic illustration of yet another recording and playback device constructed in accordance with the principles of the present invention suitable for use in the system of FIG. 1.

With reference now to the drawing, and particularly to FIG. 1 thereof, there is shown and illustrated an information retrieval system designated generally by the reference character 10.

The system comprises a playback apparatus 12, switching apparatus 14 and a plurality of interrogation stations or apparatus 16.

The playback apparatus 12 comprises a substantially conventional recording medium, such as a magnetic tape, wire, film or thread 18 provided with recorded information, such as speeches, lectures, plays, musical compositions, language lessons, etc. Only a portion of the recording medium 18 is shown in FIG. 1, and it is to be understood that the recording medium 18 will generally comprise a continuous loop of recording medium arranged to continuously and repetitively play the recorded message or information. Only a portion of the recording medium 18 is illustrated in FIG. 1, and particularly that portion of the recording medium whereat the recorded message or information begins and ends, the beginning of the message being indicated by the dashed line 20 and the end of the recorded message being indicated by the dashed line 22. While the recording medium 18 is illustrated in FIG. 1 as comprising an elongate web type material, it is to be understood that any suitable form of recording medium, such as a wire, a thread, a disk, a drum, a film, a belt, etc., may similarly be utilized, as will be described in more detail hereinafter.

The recording medium 18 is further provided with signalling means, indicated generally by the dotted line 24 for electrically or mechanically indicating or signalling the location of the beginning and end of the recorded message or information. The signalling means 24 may be of any desired construction and arrangement which would enable automatic sensing of the location of the signalling means 24. For example, the signalling means 24 may comprise electronic pulse generating means, such as a low or high frequency tone signal impressed upon the magnetic recording medium 18, an electrically conductive strip structurally associated with the recording medium 18, optical means, such as a transparent or reflective section spliced into or otherwise structurally associated with the recording medium 18 or mechanical actuating means, such as a notch, punched hole, or the like.

Positioned generally adjacent the path of travel of the recording medium 18 there are provided a plurality of pickup devices or playback heads 26 of generally conventional construction adapted to detect the recorded message or information carried by the recording medium 18 as the recording medium 18 is moved relative to the pickup devices or playback heads 26. Each of the pickup devices or heads 26 is operatively associated, in conventional manner, with the respective one of a plurality of amplifying devices 28. Means, not shown, are also provided for detecting the passage of the signalling means and automatically switching the pickup devices 26 in response to the position of the signalling means 24. For example, where the signalling means 24 comprises a recorded pulse, the pickup devices 26 may comprise the signal detecting means.

Accordingly, upon movement of the recording medium 18 relative to the plurality of pickup devices or playback heads 26, a specific location or portion of the recording medium 18, such as the beginning 20 of the message or information recorded thereon will be sequentially moved past each of the playback heads 26 to thereby sequentially generate an output signal from each of the playback heads 26 and the associated amplifier device 28 corresponding in character to the specific location or portion of the recorded message carried by the recording medium 18. Similarly, other portions of the recorded message or information carried by the recording medium 18 will be simultaneously generated in each of the other playback heads 26 and the associated amplifiers 28. Accordingly, a specific portion of the message or information recorded on the recording medium 18, such as the beginning portion 20 will be sequentially picked up or detected by each of the playback heads or devices 26 and therefore available at differing times, corresponding to the passage of that portion past the respective recording heads 26, for retrieval. Similarly, at any particular moment of time each of the pickup devices or playback heads 26 will be detecting a different portion of the recorded message or information carried by the recording medium 18, enabling a plurality of interrogators or callers to listen to different portions of the recorded information or message simultaneously. Similarly, of course, a plurality of callers or interrogators could be operatively connected with each one of the pickup devices or playback heads 26 in accordance with conventional practice.

When a caller or interrogator has requested access to the recorded message or information carried by the recording medium 18, it is not imperative that the recording be played back to him at once. A short waiting period would not be too disturbing or tax the patience of the interrogator or caller. With previous systems, if each recording were in use at the time of interrogation, an interrogator or caller would have to wait until one of the recorders was free, and in the start position. The apparatus 10 assures that the longest waiting period for any interrogator or caller would be the length of time it takes the beginning portion 20 of the message to reach any one of the plurality of pickup devices or playback heads 26, at which time the signalling means 24 will have operatively connected that head with the interrogator. The portion of the recording medium 18 between the end of the recorded message 22 and the beginning of the recorded message 20 may further be supplied with a recording which would make the waiting period less disturbing and less taxing to the patience of the interrogator, such as, a musical passage, or the like, which the interrogator or caller could be connected to at any time. For this reason, the signalling means 24 is illustrated as being positioned adjacent the end 22 of the recorded message or information carried by the recording medium 18, so that as the signalling means 24 approaches any of the pickup devices or playback heads 26, that pickup device or playback head will be connected with any interrogator or caller who may request access during the time period immediately preceding the passage of the beginning 20 of the recorded message to that one of the pickup devices or recording heads 26, or, immediately after passage of the signalling means 24 therepast. Furthermore, the maximum waiting period for any interrogator or caller may be readily made dependent upon the length of the recorded message or information. This may be readily accomplished, for example, by driving the recording medium 18 at a variable speed, the speed being selected to enable one complete cycle of operation of the recording medium 18 during the time period of the message. In this manner, the length of the recording medium 18 and the positioning of pickup devices or playback heads 26 would be fixed, and messages of differing length would be accommodated by a variation in the speed of the recording medium 18 past the pickup devices or playback heads 26.

For example, if the recorded message was of one hour's duration, and 120 pickup devices or playback heads 26 were provided, the maximum waiting period for any interrogator or caller would be only thirty seconds, a period of time that would not unduly tax the patience or be too disturbing to the interrogator. If, however, the message was of only one minute's duration, a waiting period of thirty seconds would be disturbing to the patience of an interrogator. The speed of the recording medium 18 would therefore be increased, enabling the fixed length tape to pass the 120 pickup devices or playback heads 26 much more rapidly, enabling almost instant access by any caller. Accordingly, the apparatus 10 enables the maximum access time to be proportional to the message length, and accomplishes this result simply and easily.

Furthermore, a caller or interrogator who was connected with one of the pickup devices or playback heads 26 could review short sections of the recorded message, as desired, by merely being connected to a succeeding one of the pickup devices or playback heads 26 to hear a repeat of a portion of the recorded message. Similarly, by switching a caller or interrogator to a succeeding one of the pickup devices or playback heads 26, he could skip portions of the recorded message, at will. It is within the ambit of this invention to provide means within the switching system 14 to enable such repeat or skip to be controlled from the location of the interrogation stations 16.

The switching system 14 may be of any generally conventional construction and arrangement, as are presently well known for use with individual cartridge type recorders. The switching system may, for example, comprise cross bar type relay networks, rotary stepper type relay networks, or electronic switching networks as are presently in us in telephony. Moreover, the access stations 16 may be located at any desired locations, and may be connectable with the switching system or network 14 either directly, or indirectly, through commercial telephone systems and equipment.

With reference now to FIG. 2 there is illustrated schematically one form of playback apparatus 30 suitable for use with the present invention.

The playback apparatus 30 comprises a base panel or mounting board 32 upon which a plurality of capstans 34 are rotatably mounted, as on bearing shafts 36. The recording medium 18 is threaded over and around the capstans 34 along a tortuous path, as shown, in accordance with conventional practice. The recording medium 18 may be directly engaged with the periphery of the capstans 34, or the capstans 34 might, for example, comprise air bearings whereby the recording medium 18 would be supported in spaced relationship to the peripheries of the capstans 34 on a cushion of air. The pickup devices or playback heads 26 are similarly mounted relative to the board 32 adjacent the recording medium 18. The pickup devices or playback heads 26 may be rigidly mounted relative to the board 32 or may be mounted to track generally transversely of the recording medium 18 to provide a more compact installation.

With reference now to FIG. 3, there is illustrated schematically another playback aparatus 40 suitable for use with the system of the present invention. The playback apparatus 40 is particularly adapted to utilize as the recording medium 18 a continuous strand-like magnetic carrier comprising, for example, a steel wire or a plastic thread coated with magnetic material. The recording medium 18 is generally spirally wrapped about a pair of angularly disposed rotatably supported mandrels 42 and 44 and a plurality of guide rollers 46. The pickup devices or playback heads 26 are disposed along a line generally at right angles to the recording wire or medium 18 at the point where the wire or recording medium 18 is unsupported, as shown. Each of the pickup devices or playback heads 26 would then be associated with amplifiers and a switching network as shown in FIG. 1.

With reference now to FIG. 4, there is schematically illustrated another embodiment of a playback device 50 suitable for use in the system 10. In the apparatus 50, the recording medium 18 comprises a wide band, with the recording being generally helically carried thereby. For example, and as shown, the recording medium 18 may comprise a cylinder rotatably carried by a rotatably mounted mandrel 52. The recording medium 18 is fabricated of, or the surface coated with, a magnetic material. In addition to the magnetic nature of the surface of the recording medium 18, there is provided a helical groove or ridge 54 adapted to move the pickup devices or playback heads 26 relative to the recording medium 18 upon movement of the recording medium 18. The pickup heads or playback devices 26 are slidably mounted on rods, or the like, 56 positioned in spaced relationship adjacent the surface of the recording medium 18. The heads 26 are provided with means 58 for engaging the ridges or grooves 54 of the recording medium 50 to move the playback devices or pickup heads 26 relative thereto. A solenoid mechanism, or the like, would bring each of the pickup devices or playback heads 26 into engagement with the recording medium 18, either by moving the associated rod 56 toward the recording medium 18 or by imparting a rocking motion to the pickup device or playback head 26 relative to the rod 56, or in any other well known manner. As soon as a specific pickup device or playback head 26 engages the ridge or groove 54 of the recording medium 18, the recording would be played and the head 26 move steadily along the rod 56 until reproduction is completed. At this point the head 26 would be released on the rod 56. If the rods 56, and the recording medium 18 are disposed generally vertically, then gravity could be utilized to drop the released heads 26 to the bottom of the recording medium 18 ready to start again. The interval at which the heads 26 would begin their playback journey, or movement along the rod 56, can be varied to divide the total length of the recording by the number of available heads. In the absence of a request for access, it would not be necessary for a head to start on its journey.

Figure 5:
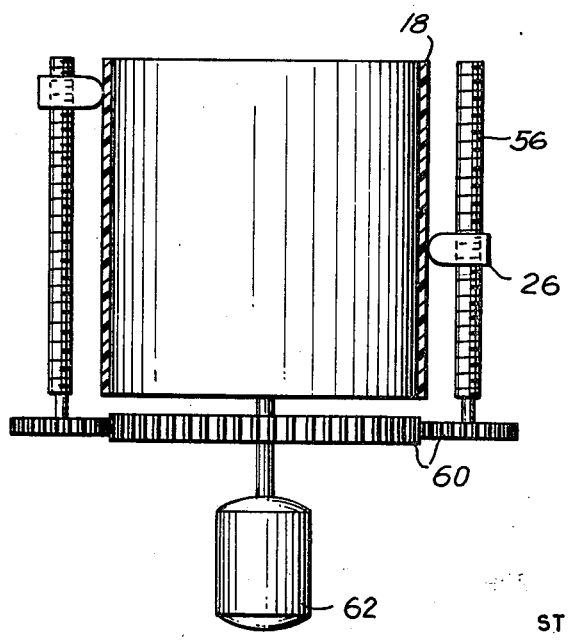
FIG. 5 is a schematic illustration of still another recording and playback device constructed in accordance with the principles of the present invention suitable for use in the system of FIG. 1.

Similarly, and with reference now to FIG. 5, the movement of the heads relative to the rods 56 may be produced by means of threads provided on the surface of the rods 56 interengaged with a split nut, or the like, associated with the playback heads 26. The rods 56 would then be rotated in synchronism with the velocity of the recording medium 18, as by gears 60. Motor means 62 would be provided in either instance to rotate or move the recording medium 18. The recording medium may also comprise a flexible belt, or the like, rather than the cylinder as shown, such as are used in numerous dictating machines presently on the market.

While magnetic recording is deemed preferable, any mechanical, optical, or electrical recording mode could also be similarly utilized.

While the invention has been shown, illustrated, described and disclosed in certain preferred embodiments or modifications which it has assumed in practice, the scope of the invention should not be deemed to be limited by the precise embodiments or modifications herein shown, illustrated, described or disclosed. Other embodiments or modifications may be suggested to those having the benefit of the teaching herein, and such other embodiments or modifications are intended to be specifically reserved especially as they fall within the scope and spirit of the claims here appended.

What is claimed is:

1. System of information retrieval comprising, in combination, a substantially continuous and endless recording medium adapted to carry information, a plurality of pickup devices positioned in substantially equally spaced apart intervals adjacent said recording medium for detecting the adjacent portion of the information carried by the recording medium, means for providing substantially constant and continuous relative movement between said recording medium and said pickup devices so that each of said pickup devices may simultaneously detect sequential portions of said medium, a signal comprising a recorded message carried by a portion of said recording medium and having a length less than the total length of said recording medium such that the message is only detectable simultaneously by less than all of said plurality of pickup devices, a second signal comprising any recorded signal not part of the message or a blank devoid of any recording carried by the remaining portion of said recording medium and having a length at least as long as the interval between two adjacent ones of said pickup devices such that at least one of said pickup devices will always be adjacent and detect said second signal, and means for selectively connecting an interrogator with a one of said plurality of pickup devices adjacent said second signal and retaining such connection throughout playback of the remainder of said second signal and said first signal so that the interrogator will always receive the entire recorded message in sequence, said connecting means comprising signalling means carried by said recording medium at the juncture of the end of the recorded message and the beginning of the second signal for indicating the relative orientation of said second signal and said pickup devices and means responsive to the position of said signalling means relative to said pickup devices for automatically switching such interrogator to a specfic pickup device which said signalling means has just passed by.

2. Method of information retrieval comprising at least the steps of translating sequential portions of a continuous and repetitive recording medium past a plurality of playback devices positioned at substantially equally spaced apart locations adjacent thereto, impressing a first signal comprising a recorded message on one of said portions having a duration such that less than all of said playback devices may simultaneously detect sequential regions thereof, impressing a second signal comprising any signal not part of the message or a blank devoid of any recording on another portion of said medium of a length such that at any given time at least one of such playback devices will detect the second signal, generating a switching signal substantially immediately subsequent to termination of the first signal, and selectively connecting a plurality of callers with such devices under control of the switching signal so that each caller will be connected with a device detecting the second signal to enable each caller to commence listening, for example, prior to the beginning of the recorded message.

3. Method defined in claim 2 further comprising at least the additional step of varying the speed of the recording to provide maximum waiting time proportional to the length of the recorded message.

4. System defined in claim 1 wherein the length of said blank portion is proportional to the length of the message.

5. System defined in claim 1 wherein said first signal comprises recorded entertainment which is enjoyable irrespective of the time of connection thereto so that an interrogating caller may know he is connected to an active pickup device and to make the wait inherent before receiving the recorded information less onerous.

6. System defined in claim 5 wherein said recording medium comprises a magnetic recording wire helically wound about a plurality of rotatable cylinders having generally parallel spaced apart axes of rotation and said pickup devices are fixedly positioned generally adjacent the path of travel of said wire so that upon rotation of said cylinders about their axes said wire will be advanced sequentially past said pickup devices simultaneously peripherally about said cylinders and longitudinally along the axes of rotation thereof.

7. System defined in claim 5 further comprising means for interrogating the system, said interrogating means comprising a telephone-type subscriber station and a telephone-type selective switching system constructed and arranged for connecting said sub-station with said pickup devices.

References Cited

UNITED STATES PATENTS

| 661,619 | 11/1900 | Poulsen | 179—100.2 |
| 2,209,157 | 5/1940 | Glunt | 179—100.2 |
| 2,209,535 | 7/1940 | Nolte | 179—100.3 |
| 2,519,725 | 8/1950 | White | 179—100.2 |
| 2,645,494 | 7/1953 | Keller | 179—100.2 |
| 2,920,147 | 1/1960 | Sellars | 179—6 X |

BERNARD KONICK, Primary Examiner

R. F. CARDILLO, Jr., Assistant Examiner

U.S. Cl. X.R.

179—100.2